Dec. 15, 1953
C. F. SCHNUCK ET AL
BLENDING AND/OR WARMING EXTRUSION
DEVICE FOR PLASTICS OR THE LIKE
2,662,243
Filed July 7, 1950
2 Sheets-Sheet 1
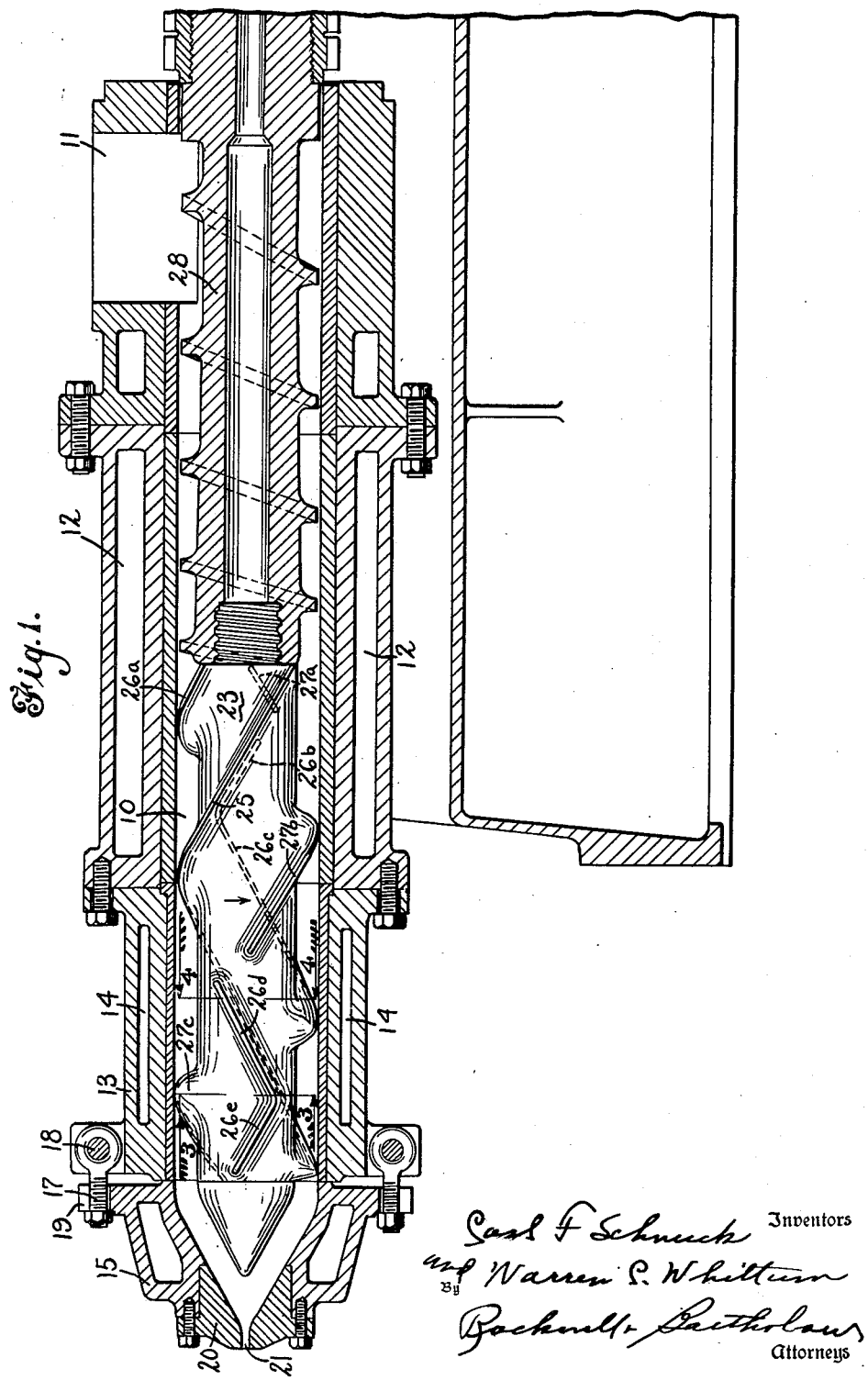

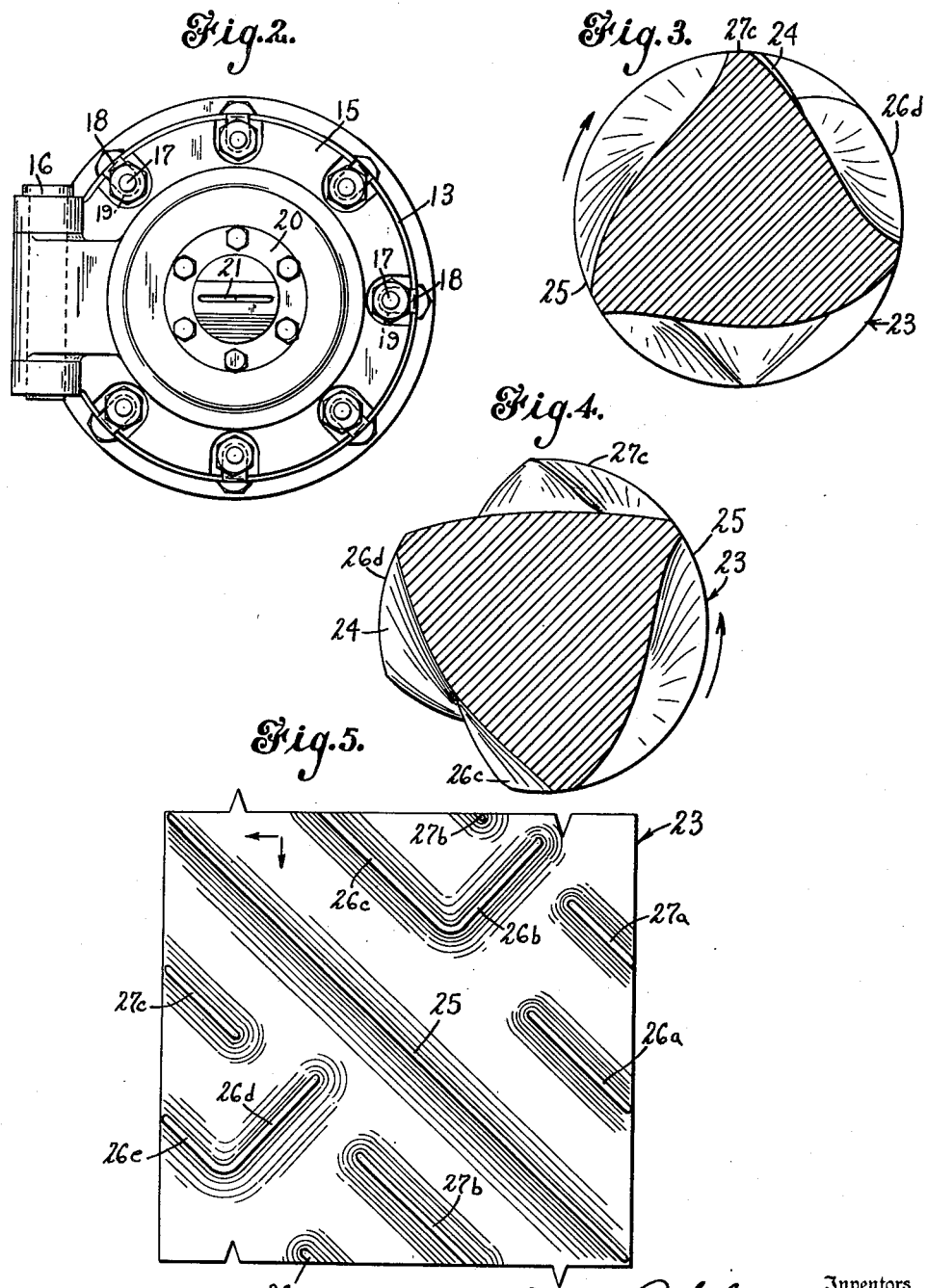

Patented Dec. 15, 1953

2,662,243

UNITED STATES PATENT OFFICE 2,662,243

BLENDING AND/OR WARMING EXTRUSION DEVICE FOR PLASTICS OR THE LIKE

Carl F. Schnuck, North Haven, and Warren C. Whittum, Ansonia, Conn., assignors to Farrel-Birmingham Company, Incorporated, Ansonia, Conn., a corporation of Connecticut Application July 7, 1950, Serial No. 172,432

4 Claims. (Cl. 18—12)

This invention relates to a method of and apparatus for treating plastic materials, and more particularly for the mixing, blending and heating of such materials by a continuous extrusion process.

In the rubber industry, and also in connection with other plastic substances, it is necessary that the materials, which are combined to form the final material from which sheets or other products are made, be mixed and blended together and also heated so that they may be in proper condition for sheeting or some other form of work which is to be performed upon the material. In some instances, materials of different types are blended together to form the final product and in any event it is necessary that the material be worked and kneaded until it is in the desired plastic condition.

When this working or kneading operation is performed under considerable pressure, as in the present instance, a considerable amount of heat is developed in the material due to the energy absorbed by the plastic mass in the blending and mixing process. It is not uncommon to apply heat to the chamber in which the material is worked, but it is more important to bring about an intense mechanical working of the mass so as to develop mechanical heat in the breaking down of the particles of the mass by the churning and kneading action effected in the chamber.

It is contemplated by the present invention to effect an intense mechanical working of a plastic mass within a chamber in a continuous extrusion process as distinguished from prior processes in which a batch of material was worked in a mixing chamber, the material discharged from the chamber and a new batch added. It will be obvious that a continuously operating machine has many advantages over a machine of the intermittent or "batch" type. Previously the desired results have not been obtained from a continuous machine in that the material in passing through the machine continuously in one direction was not worked or kneaded to a sufficient extent to develop the necessary mechanical heat, nor to bring about the desired blending, mixing or plasticizing effect.

According to the present method and apparatus, while the material travels generally in a continuously forward path through the machine, it is also, during such passage, given a reverse movement in the chamber so that there will be a thorough mixing and blending action, and the material will remain in the chamber longer and be subjected to a greater kneading and mixing action than if the entire mass were moved continuously in the same direction.

As illustrated, the material is extruded from the chamber through a relatively narrow slot so that it emerges as a strip, although the particular shape of the discharged product is, of course, subject to wide variation, and the material may be discharged in any form which is appropriate for the particular material being used. It will, however, usually be advantageous to provide a relatively restricted opening so that there will be a considerable pressure developed within the chamber which will add to the thoroughness of the mixing action and will also increase the mechanical heat developed in the material.

The above described result is obtained as illustrated by providing a chamber through which the material is passed and providing, in the chamber, a bladed rotor, certain of the blades of which are arranged to advance the material toward the discharge end of the chamber, but which rotor is also provided with certain blades which tend to return the material toward the inlet or charging end of the chamber, thus effecting a reverse movement of the material or a movement against the general direction of its passage. Thus, while the material is moved in opposite directions in the chamber, there will be an over-all continuous advancing movement thereof so that it will be extruded through the discharge opening in a continuous strip, as illustrated, or substantially continuously in any shape which may be desired.

One object of the present invention is to provide a novel method for treating plastic materials.

Another object of the invention is to provide a novel method and apparatus for the blending, mixing or heating of rubber or other plastic materials.

Still another object of the invention is to provide an apparatus of the continuous extrusion type for the blending and warming of plastic materials, the apparatus being provided with a chamber and a rotor therein, which rotor is provided with means to advance the material from the inlet to the discharge end of the chamber and during such advance effect a reverse movement of the material so as to secure an intense mixing and kneading action thereon.

Still another object of the invention is to provide an apparatus of the character described consisting of a chamber and a rotor therein, the rotor being so formed as to move the material in opposite directions within the chamber and at the same time advance the material in a generally forward direction so as to continuously discharge it from the chamber at the outlet end thereof.

To these and other ends the invention consists in the novel features and combinations of parts to be hereinafter described and claimed.

In the accompanying drawings:

Fig. 1 is a sectional view of an apparatus for mixing, blending and warming plastic materials embodying our invention;

Fig. 2 is a front elevational view thereof;

Fig. 3 is a sectional view through the rotor on line 3—3 of Fig. 1;

Fig. 4 is a sectional view through the rotor on line 4—4 of Fig. 1; and

Fig. 5 is a developed view of the surface of the rotor as it would appear if flattened out.

To illustrate a preferred embodiment of our invention, we have shown in the drawings an apparatus for blending and warming plastic products comprising a chamber 10 provided with an inlet or charging opening 11 through which the material may be introduced into the chamber. The chamber may be provided with a jacket 12 into which a heating medium may be introduced so as to supply external heat to the material while it is under treatment. The chamber is also shown as being provided with a forward portion 13 provided with a hollow jacket 14 serving the same purpose as the jacket 12.

At the front end of the chamber is provided a cap 15 which may be hinged at 16 so that it can be swung to open position, the cap being held closed by bolts 17 hinged at 18 to the jacket 14, which bolts are designed to enter slots 19 in the cap. In the present instance an end plug 20 is secured in the cap 15, this plug being provided with a discharge opening 21. The discharge opening as shown in Fig. 2 is relatively long and flat so that the material will emerge from the chamber through this opening in strip form, but it is understood that an opening of any other shape may be provided. The opening will usually, however, be relatively restricted as compared to the capacity of the machine, or the flow of material therethrough, so that pressure will be built up within the chamber.

Mounted in the chamber is a rotor, designated generally by the numeral 23. This rotor is provided with a plurality of blades which are generally helically disposed and, as will be explained hereinafter, so shaped as to provide for an intense kneading or smearing action of the material against the chamber walls at the same time that it is moved longitudinally in the chamber in one direction or the other, the net movement, however, being in a forward direction toward the discharge end of the chamber. As shown in Figs. 3 and 4 of the drawings, at 24, the blades are rounded on their forward surfaces so as to bring about this smearing and kneading action in a manner similar to those of the Banbury type mixer.

The particular formation of the blades upon the rotor 23 will now be described. One of these blades 25, as illustrated extends helically about the rotor, and is pitched in a direction to continuously move the material in the chamber toward the outlet end, it being understood that the direction of the rotor is such, as shown by the arrow of Fig. 1, that it moves downwardly on the side facing the observer in this figure, and in the direction shown by the arrows of Fig. 3 and Fig. 4. While this blade is shown as continuous, it may consist of interrupted sections.

As shown more especially in Fig. 5, the next blade of the rotor may be considered as being divided into several parts. It comprises a short portion 26ª having substantially the same pitch as the blade 25 to advance the material in a forward direction, and two segments 26ᵇ and 26ᶜ, which are pitched in opposite directions, the part 26ᵇ being reversely pitched so as to move the material toward the inlet end of the chamber, or in a reverse direction with respect to that movement effected by the parts 26ª and 26ᶜ. This blade also comprises a further portion which comprises the segments 26ᵈ and 26ᵉ, the portion 26ᵈ being reversely pitched and tending to move the material in a rearward direction as shown clearly in Fig. 5 wherein the rotor blades may be considered as moving in a downward direction, while the segment 26ᵉ moves the material forwardly.

The rotor may also be considered to have a third blade consisting of a plurality of segments or spaced parts 27ª, 27ᵇ and 27ᶜ, all of which tend to move the material in a forward direction. It will be noted that the forward end of the part 27ª will be spaced from the rear end of the part 27ᵇ to permit the part 26ᵇ of the second blade to extend therebetween, while similarly the portions 27ᵇ and 27ᶜ are spaced apart to allow the blade portion 26ᵈ to extend between them.

It will be understood that the number and arrangement of the blades upon the rotor may be varied and the invention is not limited to the particular form and arrangement illustrated, the object being to provide for an over-all forward or advancing movement of the material while at the same time moving it rearwardly during this advancing movement to secure a thorough mixing and blending thereof.

In operation it will be seen from Fig. 5 that the blade 25 will tend to propel the material continuously in a forward direction, the blade 26ª will catch the material at the end toward the inlet end and propel it forwardly until it drops off the end of this blade segment where a part of it at least will be caught by the segment 26ᵇ and moved in a reverse direction to be picked up by the blade 25. The remainder of the material propelled forwardly by the blade segment 26ª will be caught by the segment 26ᶜ and again advanced toward the discharge end of the chamber until it is released from the end of this blade segment, as shown at the bottom of Fig. 5, to be caught by the segments 26ᵈ and 26ᵉ, whereupon a part of this material will be propelled rearwardly by the segment 26ᵈ and the remainder again forwardly by the segment 26ᵉ. Likewise, the material which is engaged by the blade segments 27ª and 27ᵇ will be released by the ends of these segments to be moved rearwardly by the segments 26ᵇ and 26ᵈ and, when released therefrom, are caught by the blade 25 to be propelled forwardly.

It will be seen, threrefore, that the blade segments 26ᵇ and 26ᵈ are given a reverse pitch with respect to the remainder of the blades or blade segments upon the rotor so that there will be a reverse movement of a part of the material in the chamber to effect a thorough mixing and blending thereof, as well as a more intense mechanical action resulting in the development of heat, although the net result of the rotor action will be to move the material in a forward direction as the blades pitched in the proper direction to advance the material preponderate over those given a reverse pitch.

As illustrated in the drawings, a feed screw 28 is secured at the rear end of the rotor 23, this feed screw picking up the material fed into the opening 11 and advancing it forwardly to the rotor 23. This screw may in some instances be omitted if the forward action of the rotor 23 is sufficient to provide for the proper forward movement of the material which will be the case if the rotor 23 is of sufficient length. It will also be noted that providing a plurality of blades as shown upon the rotor 23 tends to center the rotor in the chamber so that it will have an even action upon all sides thereof and not tend to work into an inclined position with respect to the axis of the chamber.

While we have shown and described a preferred embodiment of our invention, it will be understood that it is not to be limited to all of the details shown, but is capable of modification and variation within the spirit of the invention and within the scope of the claims.

What we claim is:

1. An apparatus for treating plastic materials comprising a chamber provided with inlet and discharge openings, a rotor in said chamber having a forward section with blades thereon to move the material only in a direction toward the discharge opening and a following section having a plurality of blades thereon, certain of said last-named blades being pitched to move the material axially of the chamber in a forward direction toward the discharge opening and others of said last-named blades being disposed between certain of said last-named blades and pitched to move the material in a reverse direction, and the forwardly pitched blades on said following section having combined surfaces of greater area than those of the reversely pitched blades so as to effect discharge of the material through said discharge opening.

2. An apparatus for treating and extruding plastic materials comprising a chamber provided with inlet and discharge openings, a rotor in said chamber having a plurality of blades thereon to knead the material against the chamber wall and effect passage of the material in a forward direction to and through said discharge opening, and said rotor also having additional blades thereon disposed between said first-named blades and being opposite the same portion of the chamber as said first-named blades to move at least a part of the material in a reverse direction during such passage to obtain a thorough mixing of the material.

3. An apparatus for treating and extruding plastic materials, said apparatus comprising a chamber having an inlet opening, a discharge opening at one end of the chamber, a rotor in said chamber having blades thereon for effecting an over-all forward movement of the material through said chamber and extrude it through said discharge opening, said rotor also being provided with means to effect a reverse movement of at least a part of the material during the generally forward movement thereof in the chamber to effect a thorough mixing of the material during its passage through the chamber before its extrusion through the discharge opening both said forward movement and said reverse movement effecting means being on the same portion of the rotor and opposed to the same portion of the cylinder wall.

4. An apparatus for treating plastic materials, said apparatus comprising a chamber having an inlet opening, a discharge opening at one end of the chamber, a rotor in said chamber having blades on one portion thereof opposite a portion of the cylinder wall for effecting an over-all forward movement of the material through said chamber and extrude it through said discharge opening, said rotor also being provided with blades on the same portion thereof and opposite the same portion of the cylinder wall to effect a reverse movement of at least a part of the material during the generally forward movement thereof in the chamber to effect a thorough mixing of the material during its passage through the chamber before its extrusion through the discharge opening, said last-named blades being disposed on the rotor between said first-named blades and said discharge opening being relatively restricted with respect to the capacity of the rotor for producing forward movement of the material so as to maintain a pressure within the chamber.

CARL F. SCHNUCK.
WARREN C. WHITTUM.

References Cited in the file of this patent
UNITED STATES PATENTS

| Number | Name | Date |
|---|---|---|
| 390,567 | Schlickeysen | Dec. 23, 1884 |
| 2,431,274 | Osborne | Nov. 18, 1947 |
| 2,434,690 | Ferla | Jan. 20, 1948 |
| 2,496,625 | Henning | Feb. 7, 1950 |
| 2,543,307 | Swallow et al. | Feb. 27, 1951 |
| 2,595,455 | Heston | May 6, 1952 |